(12) United States Patent
Al-Kahwati

(10) Patent No.: US 9,713,951 B2
(45) Date of Patent: Jul. 25, 2017

(54) WINDOW TRIM FOR USE WITH A FIXED WINDOW OF A VEHICLE

(71) Applicants: AGC Automotive Americas R&D, Inc., Ypsilanti, MI (US); AGC Flat Glass North America, Inc., Alpharetta, GA (US)

(72) Inventor: Muhsin Al-Kahwati, Nokomis, FL (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 0 days.

(21) Appl. No.: 14/859,656

(22) Filed: Sep. 21, 2015

(65) Prior Publication Data

US 2017/0080789 A1 Mar. 23, 2017

(51) Int. Cl.
*B60J 10/70* (2016.01)
*B60J 10/18* (2016.01)

(52) U.S. Cl.
CPC .............. *B60J 10/70* (2016.02); *B60J 10/18* (2016.02)

(58) Field of Classification Search
CPC .... B60J 10/70; B60J 10/0088; B60J 10/0011; B60J 10/0014; B60J 10/0062;
(Continued)

(56) References Cited

U.S. PATENT DOCUMENTS 6,382,696 B1 5/2002 Young
7,950,716 B2 5/2011 Schlater et al.
(Continued)

FOREIGN PATENT DOCUMENTS

DE 195 04 828 A1 8/1996
DE 20 2008 013 133 U1 2/2010
(Continued)

OTHER PUBLICATIONS

International Search Report for Application No. PCT/US2016/052798 dated Dec. 23, 2016, 6 pages.
(Continued)

*Primary Examiner* — Glenn Dayoan
*Assistant Examiner* — Melissa A Black
(74) *Attorney, Agent, or Firm* — Howard & Howard Attorneys PLLC

(57) ABSTRACT

A window trim is used with a fixed window of a vehicle. The fixed window is fixed to the vehicle and has interior and exterior surfaces and a window edge. The window trim includes a trim body having a first section having a substantially linear configuration and a second section having an at least partially arcuate configuration defining a bend such that the second section extends back toward the first section and presents a contact surface engaging the window edge. The first section extends beyond the contact surface and along the interior surface. The window trim includes a reinforcement element having first and second reinforcement portions configured to correspond to the substantially linear and at least partially arcuate configurations of the trim body, respectively. The first and second reinforcement portions continuously extend as a single unit within the first and second portions, to support the trim body.

26 Claims, 8 Drawing Sheets

(58) Field of Classification Search
CPC . B60J 10/0071; B60J 1/02; B60J 1/004; B60J 1/006
See application file for complete search history.

(56) References Cited

U.S. PATENT DOCUMENTS

| | | | |
|---|---|---|---|
| 8,251,432 B2 * | 8/2012 | Schaff | B60J 10/18 296/93 |
| 8,444,205 B2 | 5/2013 | Flammer et al. | |
| 8,628,137 B2 | 1/2014 | Platt et al. | |
| 8,991,893 B2 | 3/2015 | Platt et al. | |
| 9,227,498 B2 | 1/2016 | Kurata et al. | |

FOREIGN PATENT DOCUMENTS

| | | |
|---|---|---|
| DE | 20 2012 102 712 U1 | 10/2013 |
| EP | 2 253 556 A1 | 11/2010 |
| JP | 2013-032083 A | 2/2013 |

OTHER PUBLICATIONS

English language abstract and machine-assisted English translation for DE 195 04 828 extracted from espacenet.com database on Jan. 11, 2017, 15 pages.

English language abstract not found for DE 20 2008 013 133; however, see English language equivalent U.S. Pat. No. 8,251,432. Original document extracted from espacenet.com database on Jan. 11, 2017, 14 pages.

English language abstract and machine-assisted English translation for DE 20 2012 102 712 extracted from espacenet.com database on Jan. 11, 2017, 16 pages.

English language abstract and machine-assisted English translation for EP 2 253 556 extracted from espacenet.com database on Jan. 11, 2017, 19 pages.

English language abstract for JP 2013-032083 extracted from espacenet.com database on Jan. 11, 2017, 2 pages.

\* cited by examiner

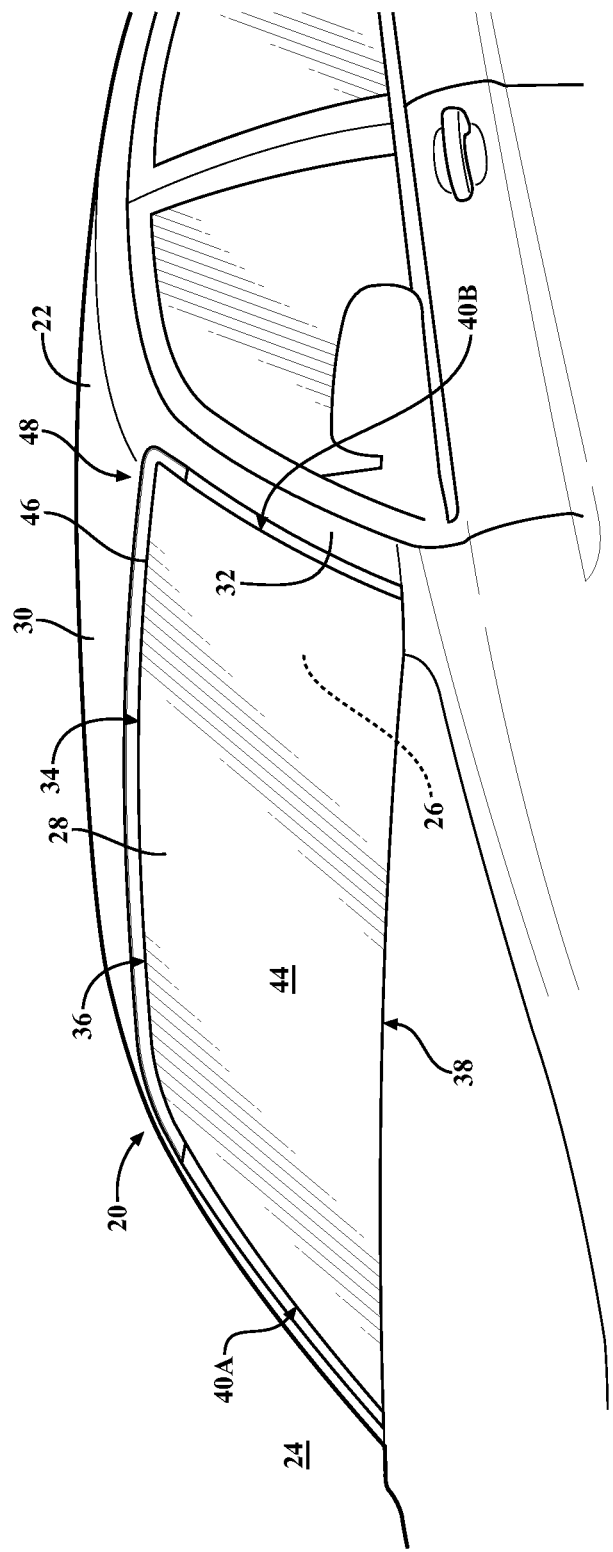

WINDOW TRIM FOR USE WITH A FIXED WINDOW OF A VEHICLE

BACKGROUND OF THE INVENTION

1. Field of the Invention

The invention generally relates to a window trim for use with a fixed window of a vehicle.

2. Description of Related Art

Vehicles typically include a fixed window assembly to allow visibility of an exterior of the vehicle to a passenger within an interior of the vehicle. One example of the fixed window assembly is commonly referred to as a windshield (or a windscreen) positioned at a front of the vehicle. The fixed window assembly includes a window trim for sealing between the windshield and a frame of the vehicle. The window trim includes a base partially extending along the windshield and sealing against an edge of the windshield. The window trim further includes a metallic support member within the base for supporting the base.

The metallic support member is comprised of several components spaced from one another. Each of the metallic support members require abutment with a drain element to support the metallic frame member against the windshield. As such, the window trim cannot unitarily seal against the windshield. Therefore, there remains a need to provide an improved window trim.

SUMMARY OF THE INVENTION AND ADVANTAGES

The subject invention provides for a window trim for use with a fixed window of a vehicle having an exterior and an interior. The fixed window is configured to be fixed to the vehicle and has an interior surface for facing the interior of the vehicle, an exterior surface for facing the exterior of the vehicle, and a window edge extending between the interior and exterior surfaces. The window trim includes a trim body having a first section having a substantially linear configuration and a second section having an at least partially arcuate configuration defining a bend such that the second section extends back toward the first section and presents a contact surface spaced from the first section. The first section extends from the second section beyond the contact surface to position the first section along the interior surface of the fixed window. The second section extends around the fixed window from the interior surface to the window edge such that the contact surface of the trim body engages the window edge of the fixed window.

The window trim further includes a reinforcement element enveloped within the trim body. The reinforcement element has a first reinforcement portion configured to correspond to both of the substantially linear configuration of the first section of the trim body and a second reinforcement portion configured to correspond to the at least partially arcuate configuration of the second section of the trim body. The first and second reinforcement portions of the reinforcement element continuously extend as a single unit within the first and second sections of the trim body to support the trim body in the substantially linear configuration and the at least partially arcuate configuration.

Accordingly, the reinforcement element unitarily supports the trim body and facilitates engagement of the window trim with the fixed window and the vehicle without the need for an additional component to support the window trim. Furthermore, the window trim provides a cost effective way to seal between the fixed window and the vehicle.

BRIEF DESCRIPTION OF THE DRAWINGS

Advantages of the subject invention will be readily appreciated as the same becomes better understood by reference to the following detailed description when considered in connection with the accompanying drawings.

FIG. 1 is a perspective view of a fixed window assembly having a fixed window and a window trim fixed to a vehicle.

DETAILED DESCRIPTION OF THE INVENTION

Figure 2A:
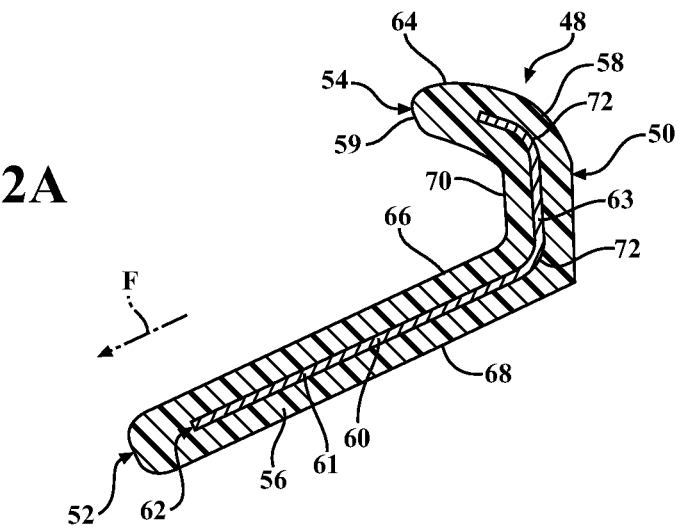
FIG. 2A is a cross-sectional view of a window trim including a trim body and a reinforcement element.

Referring to the Figures, wherein like numerals indicate corresponding parts throughout the several views, a fixed window assembly 20 for a vehicle 22, which has an exterior 24 and an interior 26, is generally shown in FIG. 1. The fixed window assembly 20 allows visibility of the exterior 24 of the vehicle 22 to a passenger within the interior 26 of the vehicle 22. The fixed window assembly 20 is commonly referred to in the art as a windshield (or a windscreen) positioned at a front of the vehicle 22. It is to be appreciated that the fixed window assembly 20 may be positioned anywhere on the vehicle 22. Furthermore, the fixed window assembly 20 is typically used in light-duty passenger vehicles, such as cars, cross-over utility vehicles, sport utility vehicles, and pick-up trucks. However, it is to be appreciated that the fixed window assembly 20 may be implemented in other types of vehicles, as well as in non-vehicle applications.

As shown in FIG. 1, the fixed window assembly 20 includes a fixed window 28 configured to be fixed to the vehicle 22. More specifically, the vehicle 22 may have a vehicle body 30 which defines a frame 32 having a substantially rectangular configuration for supporting a perimeter 34 of the fixed window 28. The perimeter 34 of the fixed window 28 may include a top 36 and a bottom 38 opposing one another and a pair of sides 40A, 40B, each transverse to the top 36 and the bottom 38, and opposing one another. In one embodiment, the fixed window 28 is fixed to the vehicle 22 about the perimeter 34 by a urethane adhesive adhering to both the fixed window 28 and the frame 32. Alternatively, the fixed window 28 may be fixed to the vehicle 22 by a butyl rope adhering to both the fixed window 28 and the frame 32. It is to be appreciated that the fixed window 28 may be fixed to the vehicle 22 by any suitable configuration.

The fixed window 28 may be a laminated glass comprised of layered multiple panes of glass as shown in FIGS. 2B, 3B, 4B, 5B, 6B, and 9B. Alternatively, the fixed window 28 may be a tempered glass comprised of single pane of glass. It is to be appreciated that the fixed window 28 may be comprised of any suitable material in any suitable configuration for allowing visibility of the exterior 24 of the vehicle 22 to a passenger within the interior 26 of the vehicle 22.

As shown in FIGS. 2B, 3B, 4B, 5B, and 6B, the fixed window 28 has an interior surface 42 for facing the interior 26 of the vehicle 22, an exterior surface 44 for facing the exterior 24 of the vehicle 22. The fixed window 28 further has a window edge 46 extending between the interior and exterior surfaces 42, 44. The window edge 46 may define the perimeter 34 of the window. Generally, the fixed window 28 is a single fixed window configured to be fixed to the vehicle 22. It is to be appreciated that the fixed window 28 may be a plurality of fixed windows configured to be fixed to the vehicle 22.

The fixed window 28 assembly 20 further includes a window trim 48 for use with the fixed window 28. The window trim 48 seals between the fixed window 28 and the vehicle 22. The window trim 48 extends longitudinally along the fixed window 28. The window trim 48 may be disposed about the perimeter 34 of the fixed window 28. In one embodiment shown in FIG. 1, the window trim 48 is disposed along the top 36 of the fixed window 28 and extends partially down the pair of sides 40A, 40B of the fixed window 28. Although not shown, the window trim 48 may be positioned along the entire perimeter 34 of the fixed window 28. It is to be appreciated that the window trim 48 may be positioned anywhere along the fixed window 28.

As shown in FIGS. 2A-6B, the window trim 48 includes a trim body 50 having a first section 56 having a substantially linear configuration and a second section 58 having an at least partially arcuate configuration defining a bend such that the second section extends back toward the first section 56 and presents a contact surface 59 spaced from the first section 56. The first section 56 extends from the second section 58 beyond the contact surface 59 to position the first section 56 along the interior surface 42 of the fixed window 28. The second section 58 extends around the fixed window 28 from the interior surface 42 to the window edge 46 such that the contact surface 59 of the trim body 50 engages the window edge 46 of the fixed window 28.

The window trim 48 further includes a reinforcement element 60 enveloped within the trim body 50. The reinforcement element 60 has a first reinforcement portion 61 configured to correspond to the substantially linear configuration of the first section 56 of the trim body 50 and a second reinforcement portion 63 configured to correspond to the at least partially arcuate configuration of the second section 58 of the trim body 50. The first and second reinforcement portions 61, 63 of the reinforcement element 60 continuously extend as a single unit within the first and second sections 56, 58 of the trim body 50 and supporting the trim body 50 in the substantially linear configuration and the at least partially arcuate configuration.

Figure 9A:
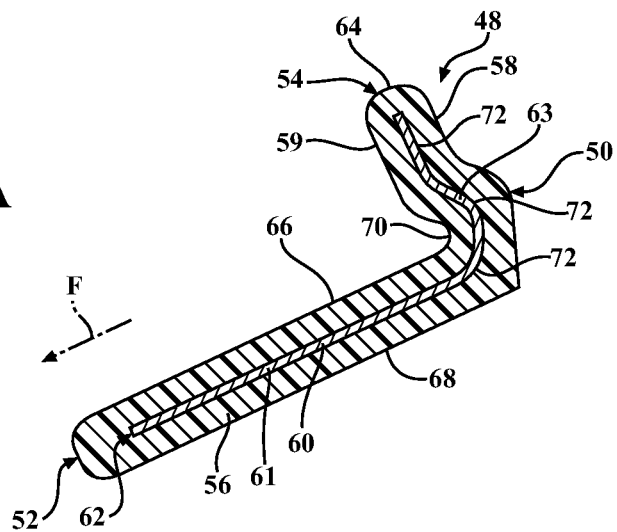
FIG. 9A is a cross-sectional view of a window trim including a trim body having a second end spaced from the fixed window and a reinforcement element.
Figure 9B:
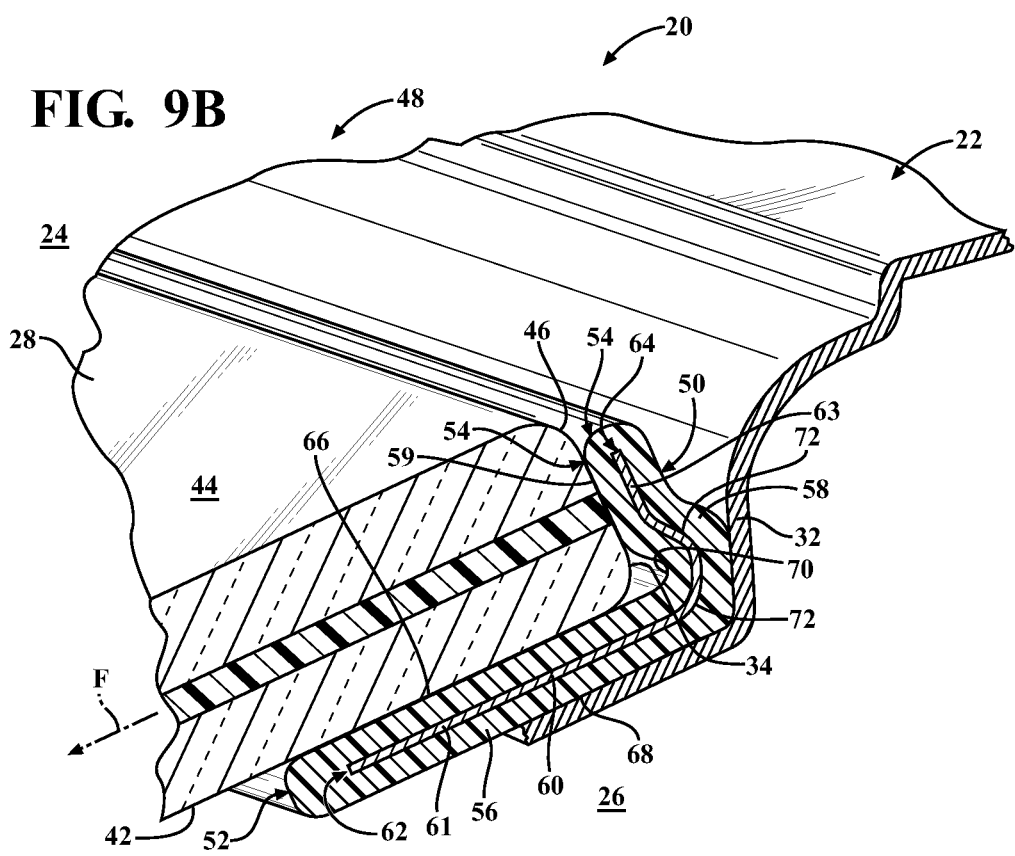
FIG. 9B is a cross-sectional perspective view of the window trim shown in FIG. 9A engaging the fixed window and the vehicle.

As shown in FIGS. 2A-6B, 9A, and 9B, the trim body 50 may have a first end 52 and a second end 54 spaced from the first end 52. The first section 56 may be adjacent the first end 52 and the second section 58 may be adjacent the second end 54. The first and second ends 52, 54 may each independently terminate to face substantially the same direction F as shown in FIGS. 2A-6B. In such a configuration, the contact surface 59 may be positioned at the second end 54. It is to be appreciated that the contact surface 59 may be positioned anywhere along the second section 58. The first section 56 may extend beyond the second end 54 to the first end 52 to extend the first section 56 along the interior surface 42 of the fixed window 28. The second section 58 may extend around the fixed window 28 from the interior surface 42 to the window edge 46 such that the second end 54 of the trim body 50 engages the window edge 46 of the fixed window 28. Alternatively, one or both of the first and second ends 52, 54 may be spaced from the fixed window, as shown in FIGS. 9A and 9B.

The reinforcement element 60 may continuously extend between a first element end 62 proximate the first end 52 of the trim body 50 and a second element end 64 proximate the second end 54 of the trim body 50 to support the trim body 50 in the substantially linear configuration and the at least partially arcuate configuration.

As shown in the Figures, the bend may be a series of bends compounding to orient the second section 58 extending back toward the first section 56. It is to be appreciated that the bend may be a single bend or any number of bends without escaping the scope of the subject invention.

The first and second ends 52, 54 of the trim body 50 facing substantially the same direction F may generally refer to the orientation of the first and second ends 52, 54 such that the first and second ends 52, 54 are positioned on substantially parallel planes. As shown in FIGS. 2B, 3B, 4B, 5B, and 6B, the first and second ends 52, 54 facing substantially the same direction F refer to the first and second ends 52, 54 facing the longitudinal orientation of the fixed window 28. It is to be appreciated that the first and second ends 52, 54 of the trim body 50 may be oriented in any suitable configuration in which the first and second ends 52, 54 face substantially the same direction F.

The substantially linear configuration of the first section 56 of the trim body 50 may generally refer to the first section 56 having a configuration that extends along the interior surface 42 of the fixed window 28. The interior surface 42 generally has a planar configuration or a slight curvature across the entirety of the fixed window 28. Further, the profile of the second section 58 of the trim body 50 may be subject to variations as a result of tolerances required for the manufacturability of the trim body 50. As such, the substantially linear configuration may deviate from a completely linear configuration without escaping the scope of the subject invention.

The window edge 46 may be transverse to the interior and exterior surfaces 42, 44. As such, the at least partially arcuate configuration of the second section 58 of the trim body 50 may generally refer to the second section 58 having a configuration that extends around from the interior surface 42 of the fixed window 28 to the window edge 46. Said differently, the at least partially arcuate configuration of the second section 58 refers to the second section 58 hooking-around to engage the window edge 46. It is to be appreciated that the at least partially arcuate configuration of second section 58 may have any suitable shape and configuration for engaging the window edge 46.

As shown in FIGS. 2A-6B, the trim body 50 of the window trim 48 may have a panel surface 66 and a frame surface 68 both extending along the first and second sections 56, 58 on opposing sides of the trim body 50 such that the panel surface 66 has a substantially concave configuration substantially facing the fixed window 28 and the frame surface 68 has a substantially convex configuration for substantially facing the vehicle 22. Furthermore, the panel surface 66 and the frame surface 68 may both extend between the first and second ends 52, 54 of the trim body 50. As such, the second section 58 of the trim body 50 facilitates the trim body 50 curving in on itself. Furthermore, the second section 58 of the trim body 50 may define a channel 70, with the channel 70 opening toward the fixed window 28 such that the second section 58 of the trim body 50 is spaced from the fixed window 28 away from the contact surface 59. The second section 58 may be spaced from the fixed window 28 away from the second end 54 when the contact surface 59 is positioned at the second end 54 as shown in FIGS. 2A-6B. The channel 70 allows for variations in the size, shape, and configuration of the fixed window 28 with channel 70 accepting the varying fixed window 28 therein. Said differently, the channel 70 allows the channel 70 to compensate for any variations in the fixed window 28.

As described above, the reinforcement element 60 is enveloped within the trim body 50. The enveloping of the reinforcement element 60 within the trim body 50 generally refers to the reinforcement element 60 being entirely surrounded by the trim body 50 along a cross-section of the window trim 48 taken transverse to the longitudinal extension of the window trim 48. It is to be appreciated that the reinforcement element 60 may be positioned anywhere within the trim body 50. In addition, the reinforcement element 60 may be positioned along, or may extend to, a surface of the trim body 50.

The continuous extension of the reinforcement element 60 between the first and second element ends 62, 64 generally refers to the reinforcement element 60 extending as a continuous unit between the first and second element ends 62, 64 such that the reinforcement element 60 supports the trim body 50 entirely between the first and second element ends 62, 64. In the embodiments shown in the Figures, the reinforcement element 60 is an integral component. Although not shown in the Figures, the reinforcement element 60 may be comprised of multiple components fixed to one another to support the trim body 50. Furthermore, although not shown in the Figures, the reinforcement element 60 may define voids between the first and second element ends 62, 64. In such a configuration, the reinforcement element 60 continuously extends between the first and second element ends 62, 64 by extending around the voids at varying cross-sections along the longitudinally extending window trim 48.

As described above, the first element end 62 of the reinforcement element 60 may be proximate the first end 52 of the trim body 50 and the second element end 64 of the reinforcement element 60 may be proximate the second end 54 of the trim body 50. As shown in Figures, the first element end 62 may be spaced from the first end 52 and second element end 64 may be spaced from the second end 54 such that the reinforcement element 60 extends along a majority of the trim body 50. In such an embodiment, the first and second element ends 62, 64 may support the first and second ends 52, 54 of the trim body 50, respectively. Although not shown, the first and second element ends 62, 64 may extend to the first and second ends 52, 54 of the trim body 50, respectively. Although the first and second element ends 62, 64 are shown at specific locations relative to the first and second ends 52, 54 of the trim body 50, respectively, in the Figures, it is to be appreciated that the first and second element ends 62, 64 of the reinforcement element 60 may be positioned relative to the first and second ends 52, 54 of the trim body 50, respectively, at any location for supporting the first and second ends 52, 54.

As shown in FIGS. 2A-6B, the second reinforcement portion 63 of the reinforcement element 60 may have at least two curves 72. The at least two curves 72 may be spaced from one another, with the one of the at least two curves 72 orienting a portion of the second section 58 transverse to the first section 56 and with another one of the at least two curves 72 orienting a portion of the second section 58 such that the second section 58 extends back toward the first section 56 and presents the contact surface 59. Said differently, the at least two curves 72 progressively curve the reinforcement element 60 such that the reinforcement element 60 curves in on itself to configure the reinforcement element 60 to the substantially linear configuration and the at least partially arcuate configuration of the trim body 50. It is to be appreciated that the reinforcement element 60 may have a single curve or any number of curves. Furthermore, the curves 72 may be any radius, including any small radius that forms, what appears to be, an angular corner.

The reinforcement element 60 may have a flexural rigidity greater than the trim body 50 to support the first section 56 of the trim body 50 in the substantially linear configuration and the second section 58 of the trim body 50 in the at least partially arcuate configuration. The reinforcement element 60 may be comprised of a metallic material such as aluminum, spring steel, stainless steel, and titanium for reinforcing the trim body 50 and is commonly referred to in the art as a metal stabilizing strip. The trim body 50 may be comprised of an elastomeric material such as thermoplastic vulcanizate ("TPV"), thermoplastic elastomer ("TPE"), styrene ethylene butylene styrene ("SEBS"), polypropylene ("PP"), and polyvinyl chloride ("PVC") for engaging and sealing against the window edge 46 of the fixed window 28 at the contact surface 59. It is to be appreciated that the reinforcement element 60 may be comprised of any suitable material for supporting the trim body 50 and the trim body 50 may be comprised of any suitable material for sealing between the fixed window 28 and the vehicle 22.

Referring now to FIGS. 2B, 3B, 4B, 5B and 6B, the reinforcement element 60 may bias the contact surface 59 of the trim body 50 toward the window edge 46. More specifically, when the fixed window assembly 20 is assembled, the window edge 46 of the fixed window 28 may forcibly engage the contact surface 59 of the trim body 50 and flex the second section 58 of the trim body 50 (and the reinforcement element 60 enveloped within the second section 58) away from the first section 56 of the trim body 50. The reinforcement element 60 may bias the second end 54 of the trim body 50 toward the window edge 46 when the contact surface 59 is positioned at the second end 54. The at least partially arcuate configuration of the second section 58 of the trim body 50 and the corresponding configuration of the reinforcement element 60 therein facilitate pivotal flexing of the second section 58 and the corresponding reinforcement element 60 therein relative to the first section 56 and the corresponding reinforcement element 60 therein. The configuration of the reinforcement element 60 and the flexural rigidity of the reinforcement element 60 resist the pivotal flexing caused by the fixed window 28. The reinforcement element 60 exerts the bias counteracting the force exerted by the fixed window 28. The bias exerted by the reinforcement element 60 forces the engagement of the contact surface 59 of the trim body 50 with the window edge 46 for sealing against the window edge 46.

Figure 2B:
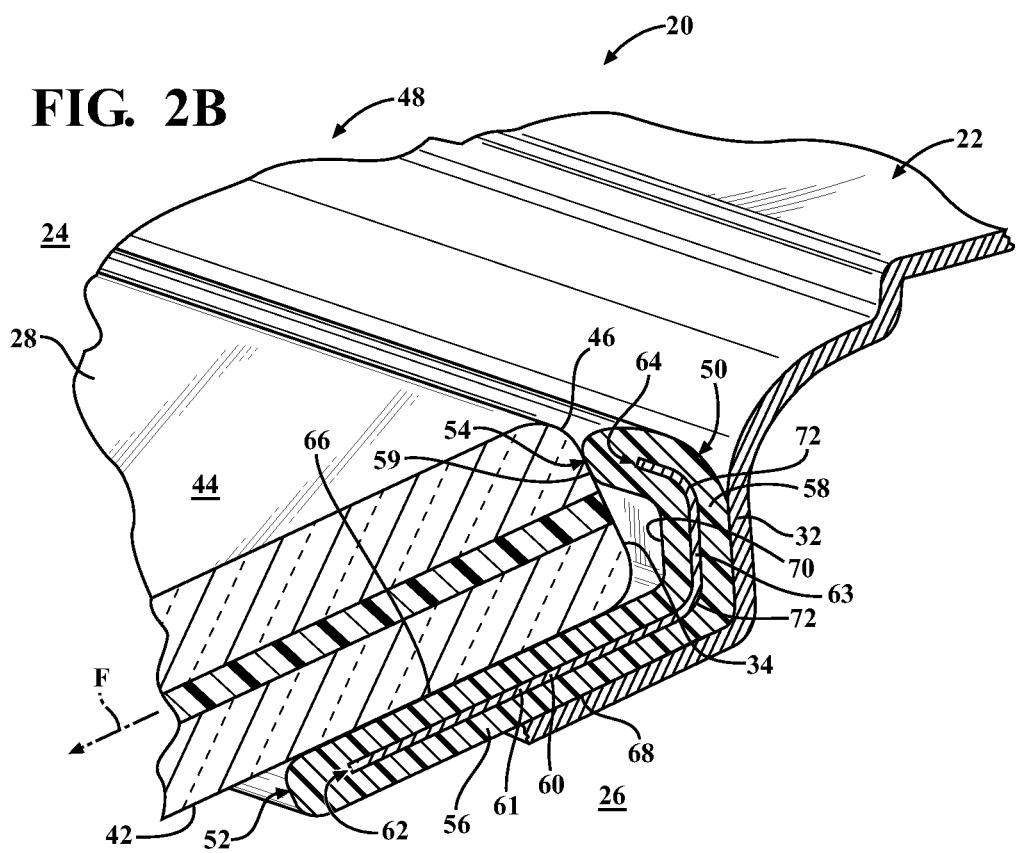
FIG. 2B is a cross-sectional perspective view of the window trim shown in FIG. 2A engaging the fixed window and the vehicle.

The first section 56 of the trim body 50 may abut the interior surface 42 of the fixed window 28, as shown in FIG. 2B. Alternatively, the first section 56 of the trim body 50 may be spaced from the interior surface 42 of the fixed window 28, as shown in FIGS. 3B, 4B, 5B and 6B. The window trim 48 may further include an adhesive 74 coupled to the panel surface 66 of the first section 56 of the trim body 50 and the interior surface 42 of the fixed window 28 to couple the window trim 48 to the fixed window 28. The adhesive 74 extends substantially parallel to the substantially linear configuration of the first section 56 of the trim body 50 and is between the first section 56 and the fixed window 28. The adhesive 74 may be comprised of any component or material for coupling the window trim 48 to the fixed window 28, including, but not limited to, pressure-sensitive adhesives, tape, and urethane.

As shown in FIGS. 3A-6B, the window trim 48 may further include a seal member 76 extending from the second section 58 of the trim body 50 of the window trim 48 with the seal member 76 abutting the fixed window 28 and configured to abut the vehicle 22 for sealing between the fixed window 28 and the vehicle 22. More specifically, the seal member 76 may be fixed to the second section 58. As shown in FIGS. 3A-6B, the seal member 76 may extend from the frame surface 68 of the second section 58 of the trim body 50 with the seal member 76 configured to abut the fixed window 28 and the vehicle 22 for sealing between the fixed window 28 and the vehicle 22. It is to be appreciated that the seal member 76 may extend from the panel surface 66 of the second section 58.

As shown in FIGS. 3A-6B, the seal member 76 may extend from the second section 58 in first and second opposing directions D1, D2 substantially parallel to the substantially linear configuration of the first section 56 of the trim body 50, with the seal member 76 extending in the first opposing direction D1 beyond the contact surface 59 toward the first section 56 and engaging the fixed window 28, and with the seal member 76 extending in the second opposing direction D2 for engaging the vehicle 22. The seal member 76 may extend in the first opposing direction D1 beyond the second end 54 toward the first end 52. The first and second opposing directions D1, D2 may be substantially parallel to the direction F that the first and second ends 52, 54 may face.

As shown in FIGS. 3A, 3B, 6A, and 6B, the seal member 76 may extend in the second opposing direction D2 beyond the trim body 50 for engaging the vehicle 22. Said differently, the seal member 76 may extend in the second opposing direction D2 to a distal end 78, with the seal member 76 presenting an abutment surface 80 between the distal end 78 and the second section 58 for engaging and sealing against vehicle 22. Alternatively, the seal member 76 may extend in the second opposing direction D2 such that the seal member 76 is substantially planar with a portion of the frame surface 68 of the second section 58 of the trim body 50, as shown in FIGS. 4A-5B. In such a configuration, the vehicle 22 extends in a planar configuration abutting each of the frame surface 68 of the second section 58 of the trim body 50 and the seal member 76. It is to be appreciated that the shape and configuration of the seal member 76 is specifically designed to ensure engagement with various configurations of the vehicle 22.

As shown in FIGS. 3A-6B, the seal member 76 may be flush with the exterior surface 44 of the fixed window 28 to create an aesthetically pleasing transition between the fixed window 28 and the window trim 48. Although not shown, it is to be appreciated that the seal member 76 may be below the exterior surface 44 or may extend above the exterior surface 44 of the fixed window 28.

The trim body 50 may be comprised of a first elastomeric material and the seal member 76 may be comprised of a second elastomeric material differing in composition from the first elastomeric material. For example, the trim body 50 may be comprised of TPV, TPE, SEBS, PP, and PVC as described above and the seal member 76 may be comprised of ethylene propylene diene monomer ("EPDM"). Alternatively, the seal member 76 may be comprised of an elastomer having a slip coating, including, but not limited to TPV, TPE, and SEBS. The second elastomeric material typically includes advantageous properties which resist noise and vibrations as the second elastomeric material rubs against the fixed window 28 and the vehicle 22.

The trim body 50 may be comprised of the first elastomeric material and the seal member 76 may be comprised of the second elastomeric material differing in material properties from the first elastomeric material. Said differently, the trim body 50 and the seal member 76 may be comprised of the same material having different material properties, such as TPV 60 Shore A and TPV 80 Shore A. It is to be appreciated that the first and second elastomeric materials may be any suitable material not specifically described herein.

As shown in FIGS. 3A-6B, the trim body 50 may have a leg 82 extending from the frame surface 68 and presenting an engagement surface 84 for engaging the vehicle 22 and positioning the window trim 48 relative to the vehicle 22. More specifically, the leg 82 may extend from the first section 56 of the trim body 50 transverse to the substantially linear configuration of the first section 56. The leg 82 may have a substantially "L" shaped configuration with the engagement surface 84 substantially parallel to the interior surface 42 of the fixed window 28. As such, the leg 82 engages the vehicle 22 along the engagement surface 84 and supports the fixed window 28 against movement as a result of force being exerted on the exterior surface 44.

The leg 82 may be integral with the trim body 50 such that the leg 82, the first section 56, and the second section 58 are all comprised of the same material, such as TPV, TPE, SEBS, PP, and PVC described above. It is to be appreciated that the leg 82 may be comprised of a material differing from the material of the first and second sections 56, 58.

Figure 3A:
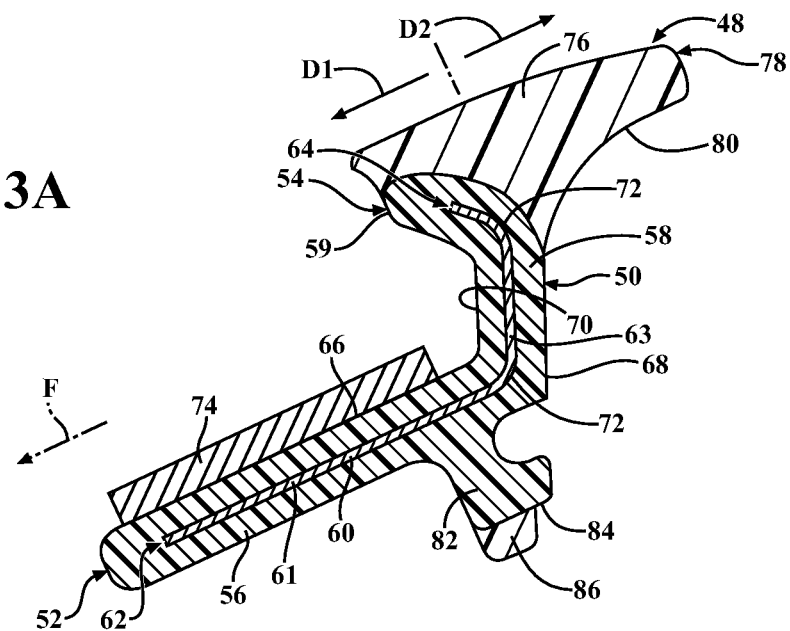
FIG. 3A is a cross-sectional view of a window trim including a trim body, a reinforcement element, a seal member, and a leg seal.
Figure 3B:
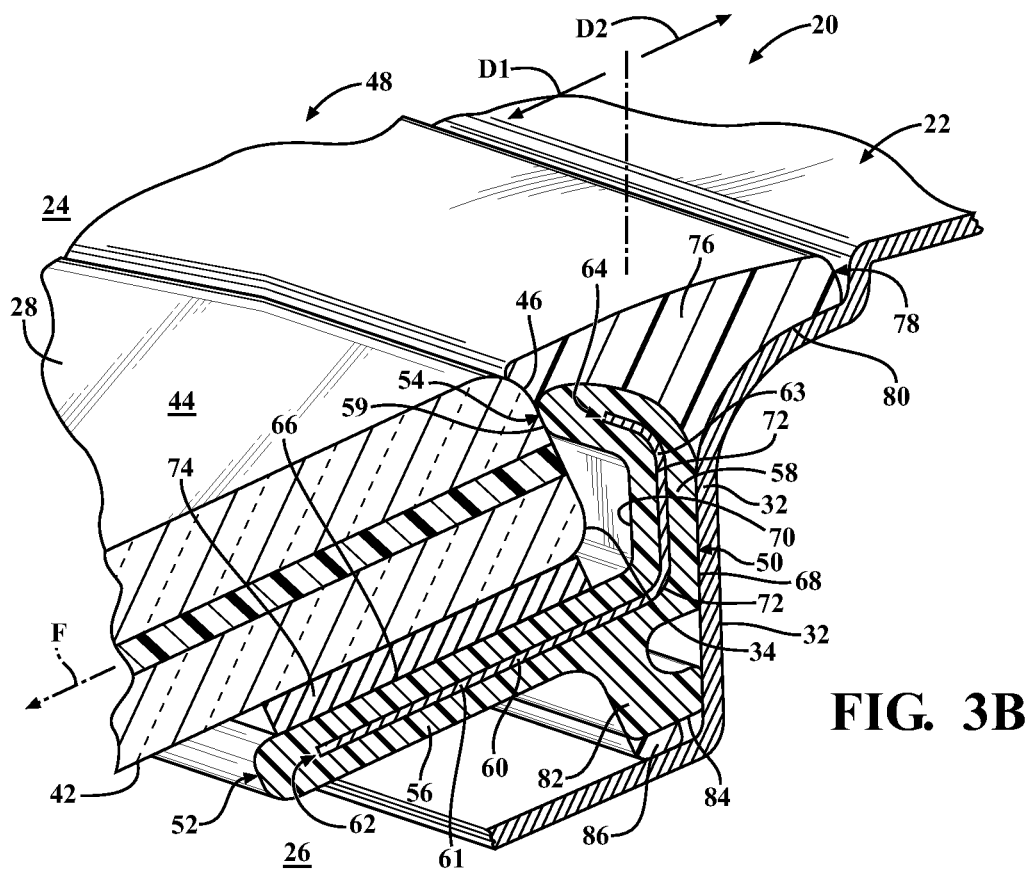
FIG. 3B is a cross-sectional perspective view of the window trim shown in FIG. 3A engaging the fixed window and the vehicle.

As shown in FIGS. 3A and 3B, the window trim 48 may further include a leg seal 86 disposed on the engagement surface 84 of the leg 82, with the leg seal 86 configured to engage and seal against the vehicle 22. More specifically, the leg seal 86 is positioned between the leg 82 and the vehicle 22 with the leg seal 86 fixed to the leg 82 and capable of deforming to engage the vehicle 22. The leg seal 86 may be comprised of the second elastomeric material. Said differently, the leg seal 86 may be comprised of the same material as the seal member 76 described above (such as EPDM and slip-coated TPV, TPE, and SEBS).

Figure 4A:
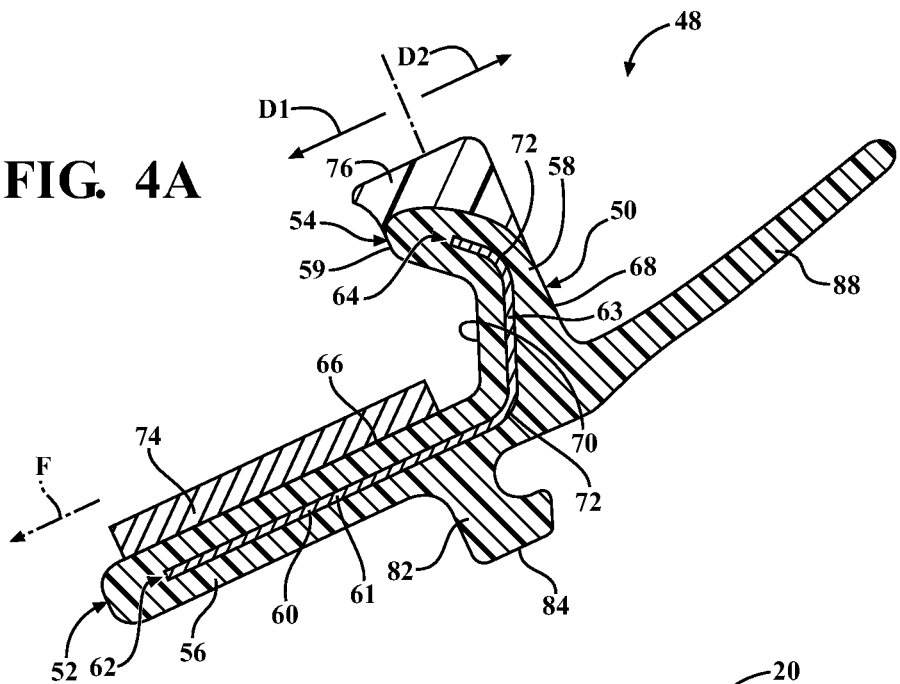
FIG. 4A is a cross-sectional view of a window trim including a trim body having a third section, a reinforcement element, and a seal member.
Figure 4B:
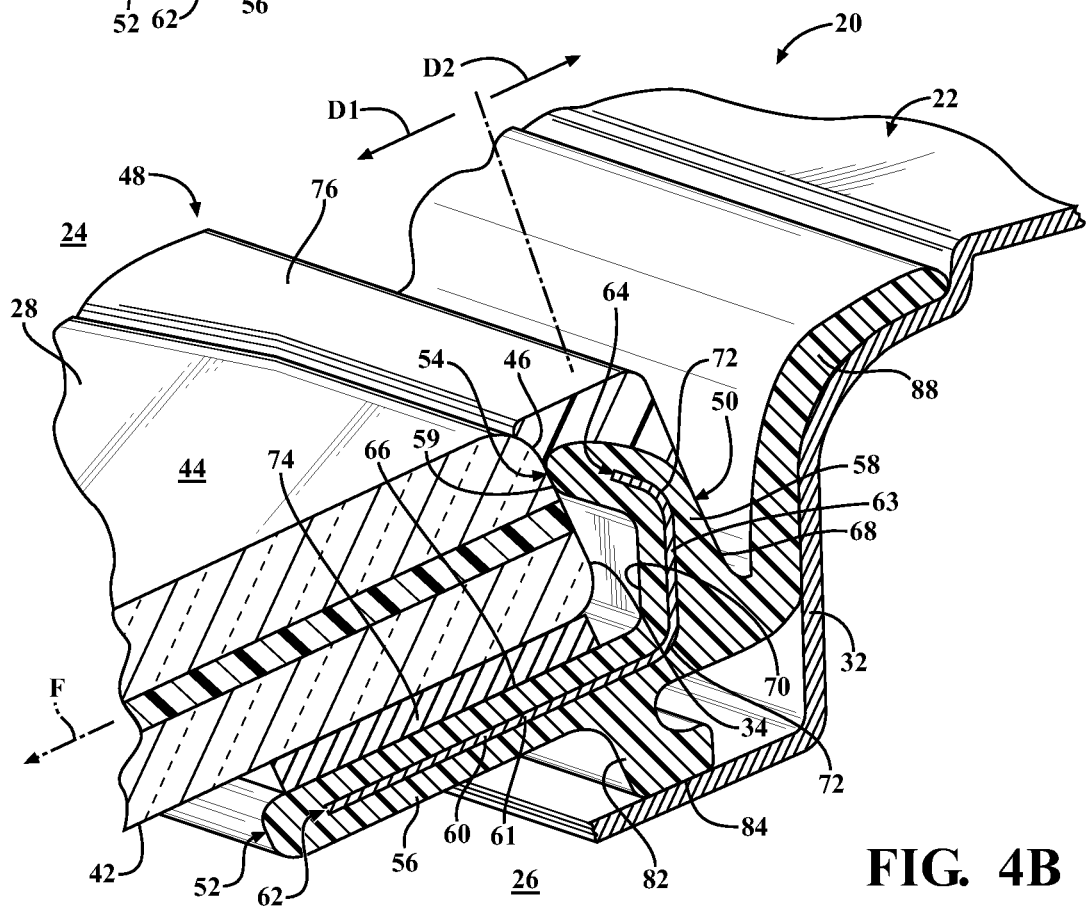
FIG. 4B is a cross-sectional perspective view of the window trim shown in FIG. 4A engaging the fixed window and the vehicle.
Figure 5A:
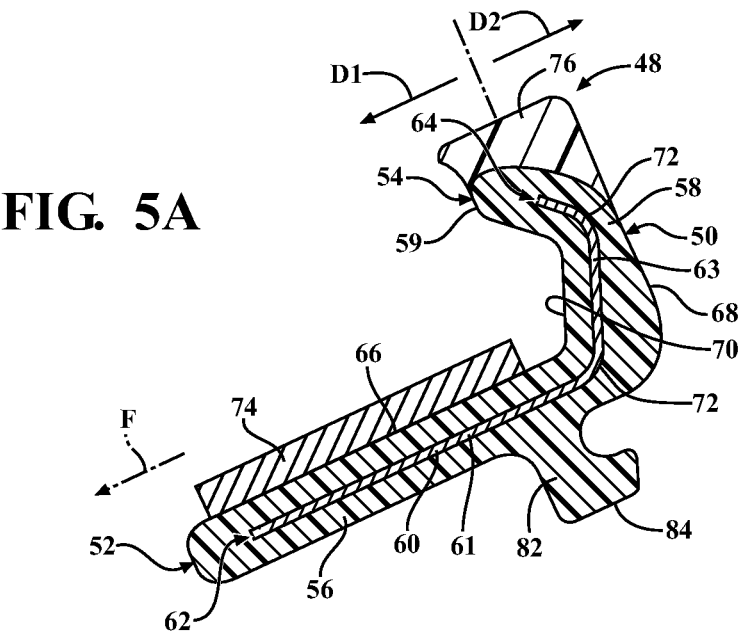
FIG. 5A is a cross-sectional view of a window trim including a trim body, a reinforcement element, and a seal member planar with a portion of the trim body.
Figure 5B:
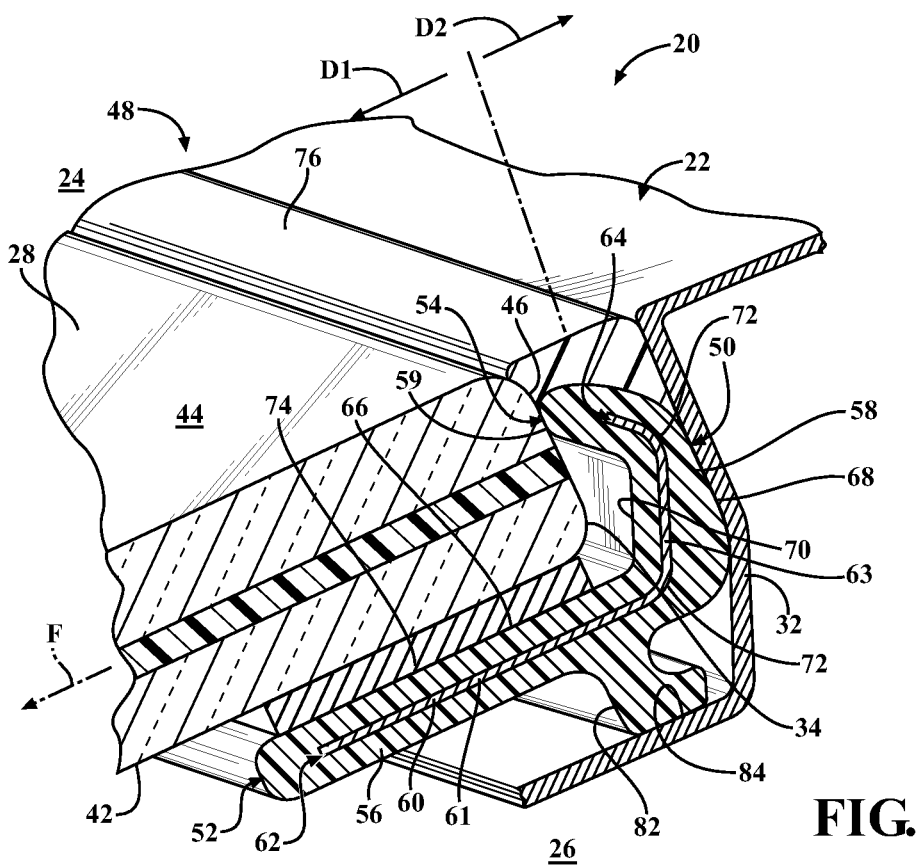
FIG. 5B is a cross-sectional perspective view of the window trim shown in FIG. 5A engaging the fixed window and the vehicle.
Figure 6A:
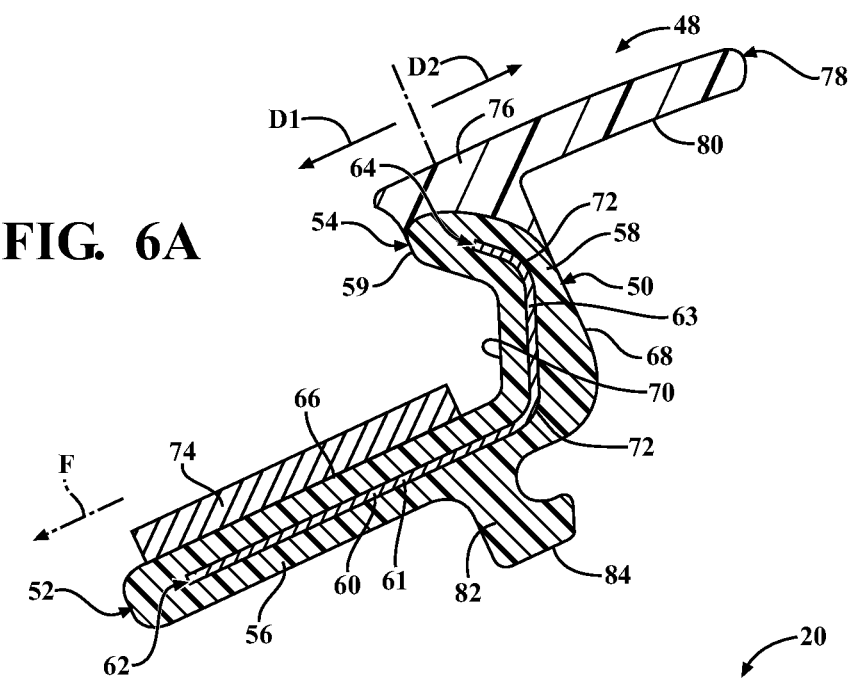
FIG. 6A is a cross-sectional view of a window trim including a trim body, a reinforcement element, and a seal member extending to a distal end.
Figure 6B:
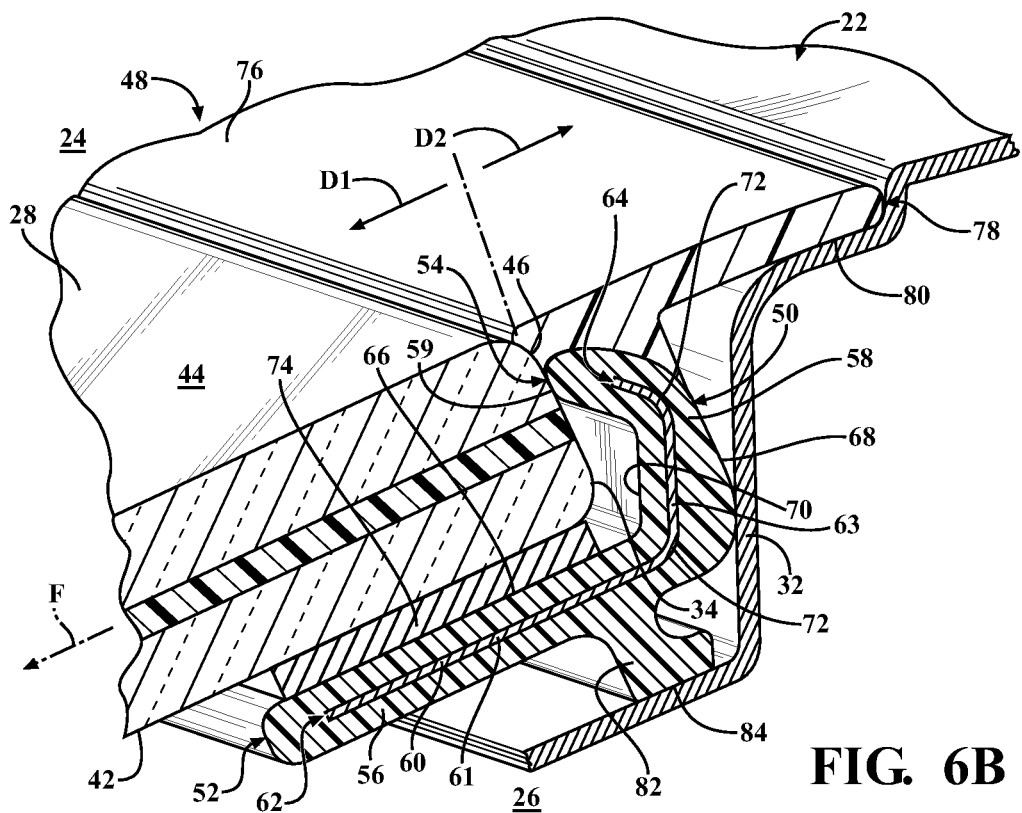
FIG. 6B is a cross-sectional perspective view of the window trim shown in FIG. 6A engaging the fixed window and the vehicle.

As shown in FIGS. 4A and 4B, the trim body 50 may have a third section 88 extending from one of the first and second sections 56, 58 for sealing against the vehicle 22. More specifically, the third section 88 may extend from the frame surface 68 of the trim body 50. In one embodiment, the third section 88 extends from the second section 58 as shown in FIGS. 4A and 4B. The third section 88 has a substantially linear configuration and extends from the second section 58 adjacent to the first section 56. The third section 88 is substantially co-planar with the first section 56 with the third section 88 lying along and sealing against the vehicle 22. It is to be appreciated that the third section 88 may extend from the second section 58 in any suitable configuration and in any suitable orientation. Although not shown, it is to be appreciated that the third section 88 may extend from the first section 56 in any suitable configuration and in any suitable orientation.

The third section 88 may be integral with the trim body 50 such that the third section 88, the first section 56, and the second section 58 are all comprised of the same material, such as TPV, TPE, SEBS, PP, and PVC described above. It is to be appreciated that the third section 88 may be comprised of a material differing from the material of the first and second sections 56, 58.

Figure 7:
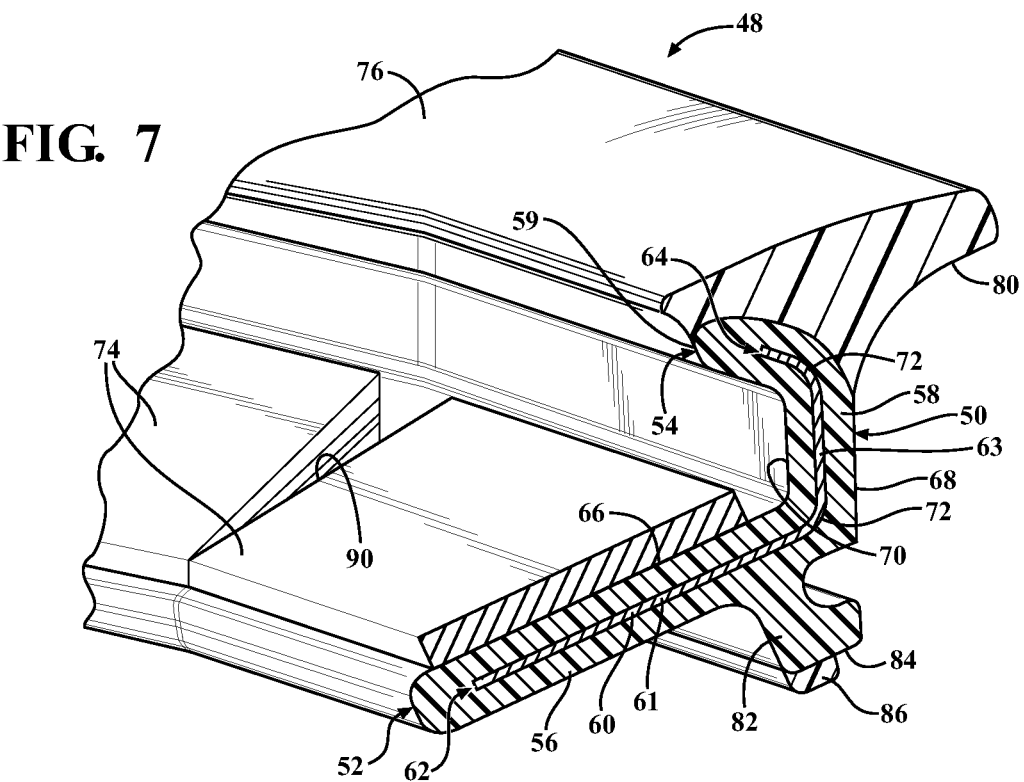
FIG. 7 is a perspective view of the window trim shown in FIG. 3A defining a recess.
Figure 8:
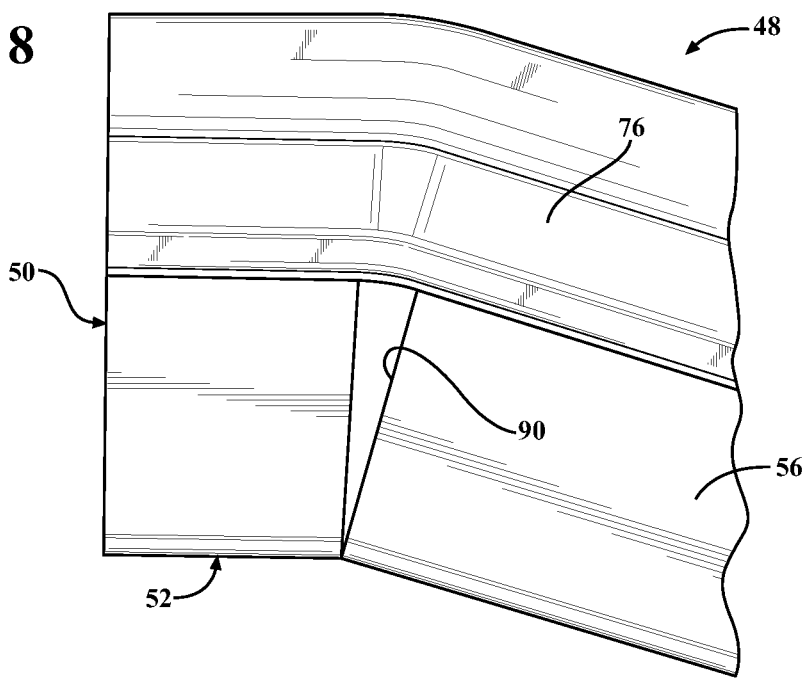
FIG. 8 is top elevational view of the window trim defining the recess.

As describe above, the window trim 48 extends longitudinally along the fixed window 28. Furthermore, the window trim 48 may be disposed about the perimeter 34 of the fixed window 28, such as the embodiment shown in the FIG. 1 where the window trim 48 is disposed along the top 36 of the fixed window 28 and extends partially down the pair of sides 40A, 40B of the fixed window 28. To transition the extension of the window trim 48 from one portion of the fixed window 28 to another (e.g., from the top 36 to one of the sides 40A, 40B of the fixed window 28), the window trim 48 is bent. To facilitate the bending of the window trim 48 without buckling the window trim 48, a portion of the window trim 48 is absent longitudinally along the window trim 48. In one embodiment shown in FIGS. 7 and 8, the first section 56 of the trim body 50 and the reinforcement element 60 therein define a recess 90 longitudinally along the window trim 48. The recess 90 facilitates bending of the window trim 48 at the recess 90, with the window trim 48 bending until portions of the first section 56 of the trim body 50 on opposing sides of the recess 90 abut one another. The recess 90 is defined on a side of the window trim 48 that forms an acute angle after bending. As such, any portion of the window trim 48 may define the recess 90 depending on the direction of the bend in order to facilitate the bending of the window trim 48 without buckling the window trim 48.

As set forth above, the reinforcement element 60 advantageously provides unitary support of the trim body 50 and facilitates engagement of the window trim 48 with the fixed window 28 and the vehicle 22 without the need for an additional component to support the window trim 48. For example, the window trim 48 may not be supported by a drain pan, as is commonly found in the art. Furthermore, the window trim 48 provides a cost effective way to seal between the fixed window 28 and the vehicle 22.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fixed window assembly for a vehicle, which has an exterior and an interior, said fixed window assembly comprising:
   a fixed window configured to be fixed to the vehicle and having an interior surface for facing the interior of the vehicle, an exterior surface for facing the exterior of the vehicle, and a window edge extending between said interior and exterior surfaces; and
   a window trim comprising:
      a trim body having a first section having a substantially linear configuration and a second section having an at least partially arcuate configuration defining a bend such that said second section extends back toward said first section and presents a contact surface spaced from said first section, with said first section extending from said second section beyond said contact surface to position said first section along said interior surface of said fixed window, with said second section extending around said fixed window from said interior surface to said window edge such that said contact surface of said trim body engages said window edge of said fixed window; and
      a reinforcement element enveloped within said trim body, with said reinforcement element having a first reinforcement portion configured to correspond to said substantially linear configuration of said first section of said trim body and a second reinforcement portion configured to correspond to said at least partially arcuate configuration of said second section of said trim body, and with said first and second reinforcement portions of said reinforcement element continuously extending as a single unit within said first and second sections of said trim body and supporting said trim body in said substantially linear configuration and said at least partially arcuate configuration;
      wherein said window trim is not supported by a drain pan of the vehicle.

2. The fixed window assembly as set forth in claim 1 wherein said second section of said trim body defines a channel which opens toward said fixed window such that said second section of said trim body is spaced from said fixed window away from said contact surface.

3. The fixed window assembly as set forth in claim 1 wherein said trim body of said window trim has a panel surface and a frame surface both extending along said first and second sections on opposing sides of said trim body, with said panel surface having a substantially concave configuration facing the fixed window, and said frame surface having a substantially convex configuration for facing the vehicle.

4. The fixed window assembly as set forth in claim 3 wherein said window trim further comprises an adhesive coupled to said panel surface of said first section of said trim body and said interior surface of said fixed window to couple said window trim to said fixed window.

5. The fixed window assembly as set forth in claim 1 wherein said window trim further comprises a seal member extending from said second section of said trim body, with said seal member abutting said fixed window and configured to abut the vehicle for sealing between said fixed window and the vehicle.

6. The fixed window assembly as set forth in claim 5 wherein said seal member extends from said second section in first and second opposing directions substantially parallel to said substantially linear configuration of said first section of said trim body, with said seal member extending in said first opposing direction beyond said contact surface toward said first section and engaging said fixed window, and with said seal member extending in said second opposing direction for engaging the vehicle.

7. The fixed window assembly as set forth in claim 1 wherein said reinforcement element biases said contact surface of said trim body toward said window edge.

8. A window trim for use with a fixed window of a vehicle having an exterior and an interior, with the fixed window configured to be fixed to the vehicle and having an interior surface for facing the interior of the vehicle, an exterior surface for facing the exterior of the vehicle, and a window edge extending between the interior and exterior surfaces; said window trim comprising:
 a trim body having a first section having a substantially linear configuration and a second section having an at least partially arcuate configuration defining a bend such that said second section extends back toward said first section and presents a contact surface spaced from said first section, with said first section extending from said second section beyond said contact surface for positioning said first section along the interior surface of the fixed window, with said second section configured to extend around the fixed window from the interior surface to the window edge such that said contact surface of said trim body is configured to engage the window edge of the fixed window; and
 a reinforcement element enveloped within said trim body, with said reinforcement element having a first reinforcement portion configured to correspond to said substantially linear configuration of said first section of said trim body and a second reinforcement portion configured to correspond to said at least partially arcuate configuration of said second section of said trim body, and with said first and second reinforcement portions of said reinforcement element continuously extending as a single unit within said first and second sections of said trim body to support said trim body in said substantially linear configuration and said at least partially arcuate configuration;
 wherein said trim body has a panel surface and a frame surface both extending along said first and second sections on opposing sides of said trim body such that said panel surface has a substantially concave configuration for substantially facing the fixed window and said frame surface has a substantially convex configuration for substantially facing the vehicle.

9. The window trim as set forth in claim 8 wherein said reinforcement element is configured to bias said contact surface of said trim body toward the window edge.

10. The window trim as set forth in claim 8 wherein said reinforcement element has a flexural rigidity greater than said trim body to support said first section of said trim body in said substantially linear configuration and said second section of said trim body in said at least partially arcuate configuration.

11. The window trim as set forth in claim 8 wherein said second reinforcement portion of said reinforcement element has at least two curves.

12. The window trim as set forth in claim 11 wherein said at least two curves are spaced from one another, with said one of said at least two curves orienting a portion of said second section transverse to said first section and with another one of said at least two curves orienting a portion of said second section such that said second section extends back toward said first section and presents said contact surface.

13. The window trim as set forth in claim 8 further comprising a seal member extending from said second section of said trim body with said seal member configured to abut the fixed window and the vehicle for sealing between the fixed window and the vehicle.

14. The window trim as set forth in claim 13 wherein said seal member extends from said second section in first and second opposing directions substantially parallel to said substantially linear configuration of said first section of said trim body, with said seal member extending in said first opposing direction beyond said contact surface toward said first section for engaging the fixed window and with said seal member extending in said second opposing direction for engaging the vehicle.

15. The window trim as set forth in claim 14 wherein said seal member extends in said second opposing direction beyond said trim body for engaging the vehicle.

16. The window trim as set forth in claim 13 wherein said trim body is comprised of a first elastomeric material and said seal member is comprised of a second elastomeric material differing in composition from said first elastomeric material.

17. The window trim as set forth in claim 16 wherein said trim body has a leg extending from said first section and presenting an engagement surface, with said window trim further comprising a leg seal disposed on said engagement surface, and with said leg seal comprised of said second elastomeric material.

18. The window trim as set forth in claim 13 wherein said trim body is comprised of a first elastomeric material and said seal member is comprised of a second elastomeric material differing in material properties from said first elastomeric material.

19. The window trim as set forth in claim 8 further comprising an adhesive coupled to said panel surface of said first section of said trim body for engaging the interior surface of the fixed window and coupling said window trim to the fixed window.

20. The window trim as set forth in claim 8 further comprising a seal member extending from said frame surface of said second section of said trim body with said seal member configured to abut the fixed window and the vehicle for sealing between the fixed window and the vehicle.

21. The window trim as set forth in claim 8 wherein said trim body has a leg extending from said frame surface and presenting an engagement surface for engaging the vehicle and positioning said window trim relative to the vehicle.

22. The window trim as set forth in claim 21 further comprising a leg seal disposed on said engagement surface of said leg, with said leg seal configured to engage and seal against the vehicle.

23. The window trim as set forth in claim 21 wherein said leg extends from said first section of said trim body transverse to said substantially linear configuration of said first section.

24. The window trim as set forth in claim 8 wherein said trim body has a third section extending from one of said first and second sections for sealing against the vehicle.

25. A window trim for use with a fixed window of a vehicle having an exterior and an interior, with the fixed window configured to be fixed to the vehicle and having an interior surface for facing the interior of the vehicle, an exterior surface for facing the exterior of the vehicle, and a window edge extending between the interior and exterior surfaces; said window trim comprising:

a trim body having a first section having a substantially linear configuration and a second section having an at least partially arcuate configuration defining a bend such that said second section extends back toward said first section and presents a contact surface spaced from said first section, with said first section extending from said second section beyond said contact surface for positioning said first section along the interior surface of the fixed window, with said second section configured to extend around the fixed window from the interior surface to the window edge such that said contact surface of said trim body is configured to engage the window edge of the fixed window; and a reinforcement element enveloped within said trim body, with said reinforcement element having a first reinforcement portion configured to correspond to said substantially linear configuration of said first section of said trim body and a second reinforcement portion configured to correspond to said at least partially arcuate configuration of said second section of said trim body, and with said first and second reinforcement portions of said reinforcement element continuously extending as a single unit within said first and second sections of said trim body to support said trim body in said substantially linear configuration and said at least partially arcuate configuration;

wherein said second reinforcement portion of said reinforcement element has at least two curves.

26. The window trim as set forth in claim 25 wherein said at least two curves are spaced from one another, with said one of said at least two curves orienting a portion of said second section transverse to said first section and with another one of said at least two curves orienting a portion of said second section such that said second section extends back toward said first section and presents said contact surface.

\* \* \* \* \*